United States Patent [19]
Leclercq

[11] 4,302,294
[45] Nov. 24, 1981

[54] NUCLEAR REACTOR FUEL ASSEMBLIES

[75] Inventor: Joseph Leclercq, Le Vesinet, France

[73] Assignee: Framatome, Courbevoie, France

[21] Appl. No.: 37,482

[22] Filed: May 9, 1979

[30] Foreign Application Priority Data

May 19, 1978 [FR] France ............................... 78 14859

[51] Int. Cl.³ ............................................... G21C 3/30
[52] U.S. Cl. ......................................... 376/446; 376/438
[58] Field of Search ................................... 176/76, 78

[56] References Cited
U.S. PATENT DOCUMENTS 3,791,466  2/1974  Patterson ............................. 176/78
4,081,324  3/1978  Flora ..................................... 176/78
4,135,972  1/1979  Anthony ............................... 176/78

*Primary Examiner*—Donald P. Walsh
*Attorney, Agent, or Firm*—Haseltine and Lake

[57] ABSTRACT

A nuclear reactor fuel assembly comprises a bundle of parallel rods which are transversely spaced by cross-pieces, and is supported by support tubes which extend between, and are fixed at their ends to, two grids. The grids have cells which are aligned with the fuel rods and through which the fuel rods can be withdrawn. The grids are detachably connected to end plates by sockets which are removably engaged in the end plates and cells of the grids.

5 Claims, 7 Drawing Figures

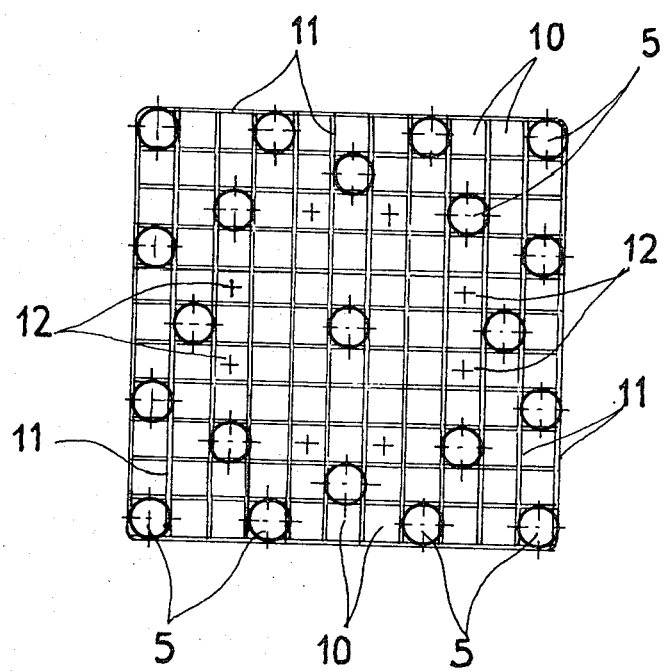

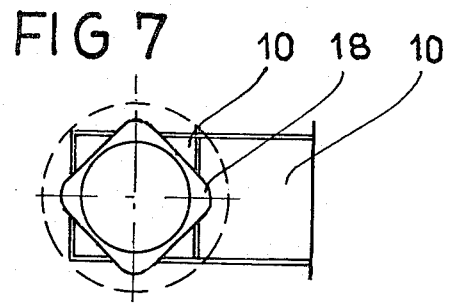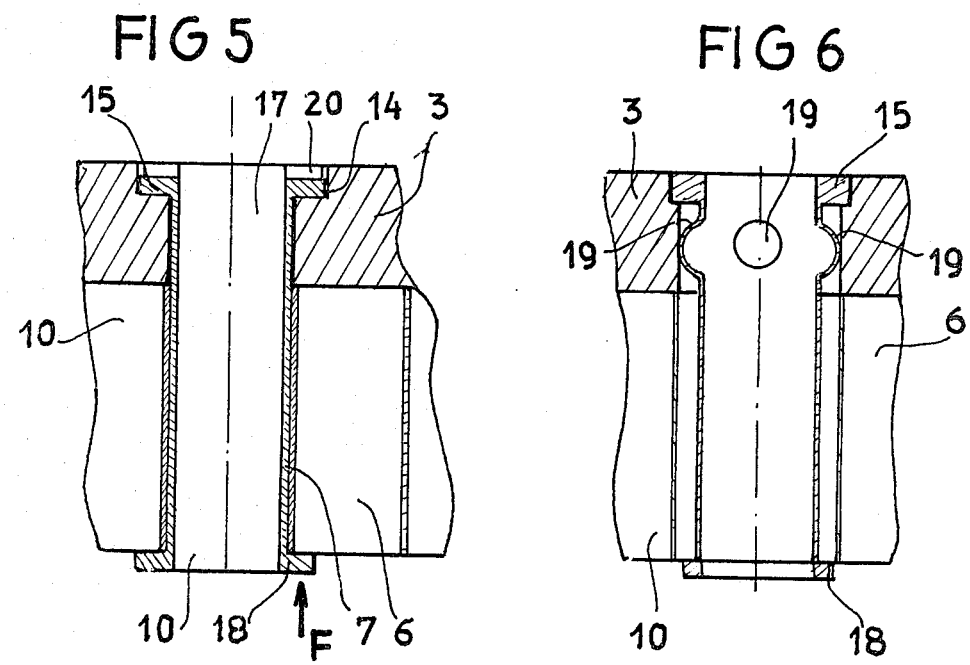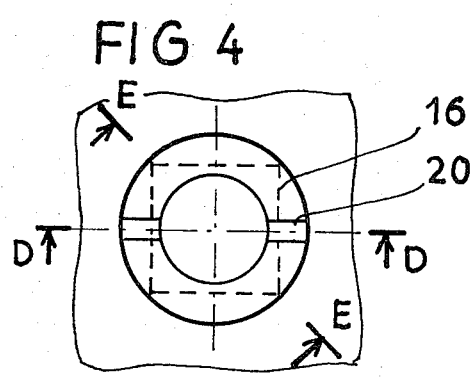

NUCLEAR REACTOR FUEL ASSEMBLIES

The invention relates to improvements in nuclear reactor fuel assemblies.

Fuel assemblies, in particular those which are used in water-cooled reactors, generally consist of a bundle of parallel fuel rods held apart by means of cross-pieces which extend transversely relative to the rods. Tubes for supporting the assembly are substituted for some of the fuel rods, and these support tubes, which are longer than the rods, are themselves joined to end plates which make it possible to achieve a good mechanical rigidity of the assembly and to hold the fuel rods in the longitudinal direction.

When the nuclear reactor core is recharged, it is extremely useful to be able to remove defective fuel rods and to replace them, so as to be able to continue using the whole assembly, with the removal, from the reactor circuit, of the contamination caused by fission products originating from the defective fuel rods.

This ability to remove rods provides the advantage that it economizes in terms of fuel since, once the assembly has been reconstituted, it can be recharged and re-used, after the defective rods have been removed and replaced.

Furthermore, replacement of defective rods enables the reactors to be run with greater safety for the installations and the personnel by reducing the contamination risks.

However, changing defective rods is an operation which requires considerable precautions; the irradiated element can ony be repaired under radiological protection. In general, this operation is carried out under a certain depth of water in a swimming pool adjacent the reactor.

Furthermore, for certain more specific reasons, for example in order to carry out examinations of some of the rods or to perform mechanical or physical tests on these rods, it can be of value for the user to be able to dismantle a fuel assembly in order to recover those bars on which the tests or examinations are to be carried out.

In order to have access to these fuel rods and to be able to separate them from the remainder of the assembly, it is necessary to dismantle the end plates; this dismantling operation in the swimming pool presents certain difficulties because the assembly is only accessible by remote control and because the dismantling operation is performed on an immersed assembly.

For the purpose of facilitating the operation for dismantling and reassembling the fuel rods in the assembly inside the swimming pool, it has been proposed to detachably fix the end plates to the support tubes so that the end plates can be easily dismantled by remote control when the assembly is inside the swimming pool.

To enable this detachable fixing of the end plates to the support tubes, screw-threaded sockets, for example, have been proposed which sockets are screwed inside the support tubes. Each socket has a shaped enlarged portion which fits in a housing, of corresponding shape, provided on the inner face of the end plate.

Rotation of the sockets is prevented by expanding part of the sockets inside the housings provided in the end plate.

This proposal makes it possible to dismantle the end plate from the support tubes rapidly and easily; however, when the end plates have been dismantled, the ends of the support tubes are no longer held in the transverse direction relative to one another, and, when reassembling, it is necessary to realign the end plate with the set of support tubes which must be inserted in the housings provided in the end plate.

According to the invention there is provided a nuclear reactor fuel assembly comprising a bundle of parallel fuel rods held apart by cross-pieces which extend transversely relative to said rods, and tubes, for supporting the assembly, which are substituted for some of said fuel rods, said support tubes being longer than said rods and ensuring, in cooperation with transverse end plates, the rigid assembling of the whole, said plates also ensuring the longitudinal support of said rods, wherein, at one or both of their end, said support tubes are fixed to a grid extending transversely relative to said support tubes, said grid forming a network of cells which approximately correspond, in size and position, to said fuel rods, so that a said rod can pass by longitudinal displacement through a said cell of said grid, said grid being detachably fixed to the corresponding said end plate which is positioned outwardly of said grid, by cylindrical sockets which extend through passages provided in said end plate and through some of said cells of said grid, each said socket comprising:

bearing surfaces at the level of the outer face of said end plate and the inner face of said grid, means at the outer end of said socket for cooperation with a tool for rotating said socket between a first position in which said socket can be freely inserted into said cell of said grid, and a second position in which said bearing surface at the level of said inner face of said grid comes into contact with said inner face of said grid to lock said grid to said end plate, and a deformable part which is expandable into one or more housings provided at the level of said passage in said end plate or of said cell of said grid to prevent rotation of said socket relative to said grid.

In order to provide a clear understanding of the invention, an embodiment of a fuel assembly according to the invention will now be described, by way of example only, with reference to the accompanying drawings:

FIG. 3 is a sectional view along the line B—B of FIG. 1, and shows a grid for the support tubes, which grid is arranged in the upper part of the fuel assembly;

FIG. 4 is a view in the direction C of FIG. 1, of the upper end of a socket for connecting the upper end plate to the upper grid;

FIG. 5 is a section on the line D—D of FIG. 4 showing the socket in position in the end plate and the grid;

FIG. 6 is a section on the line E—E of FIG. 4; and

FIG. 7 is a view in the direction F of FIG. 5 of the socket in locking position against the inner face of the grid.

Figure 1:
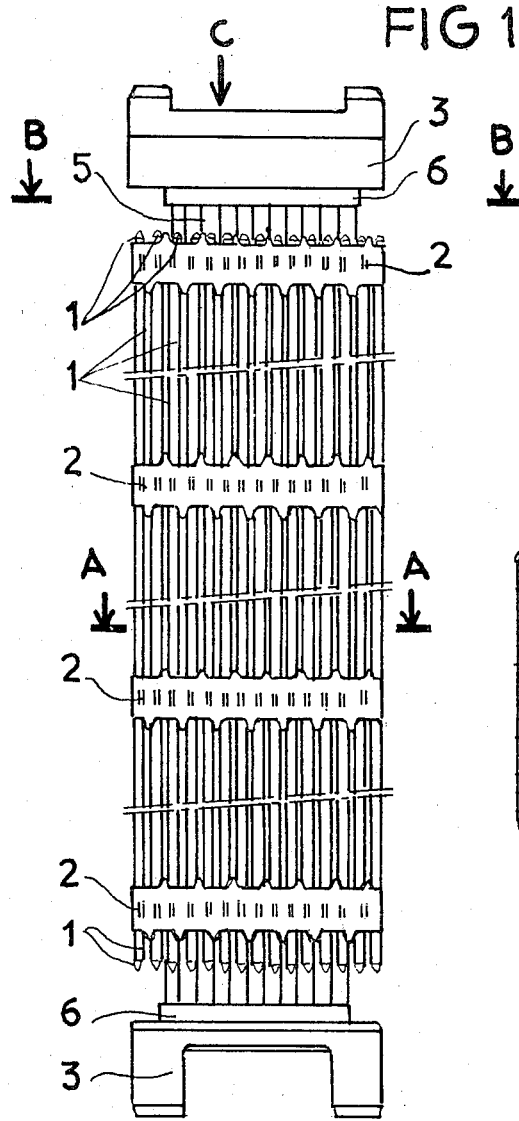
FIG. 1 is an overall view, in elevation, of an embodiment of a nuclear reactor fuel assembly of the type described.

The fuel assembly shown in FIG. 1 comprises a set of parallel fuel rods 1 held in a rigid bundle by means of transverse cross-pieces 2, which are arranged at approximately regular intervals over the length of the rods, and end plates 3.

Figure 2:
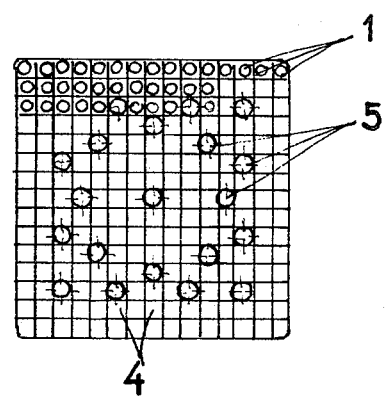
FIG. 2 is a transverse section along the line A—A of FIG. 1, showing the arrangement of fuel rods and of support tubes inside a cross-piece.

As shown in FIG. 2 each cross-piece 2 defines cells 4 through which the fuel rods extend. Some of these cells 4 are occupied by support tubes 5 which are substituted for a certain number of fuel rods. The length of the support tubes 5 is slightly greater than the length of the fuel rods 1, and the tubes 5 are joined at their ends to grids 6.

As can be seen in FIG. 3, each grid 6 provides a network of square cells 10. When the grid 6 is in position in the assembly, as shown in FIG. 1, the support tubes 5, which are permanently fixed to the grids 6 either by crimping or by crimping and welding, are positioned in some of the cells 10.

Each of the grids 6 comprises an assembly of metal strips or small metal plates 11, of a certain height, which intersect and are fixed to one another. Some of the cells of each grid 6, which cells 10 are indicated by crosses 12 in FIG. 3, are intended to receive sockets for joining the grid to the respective end plate 3.

The network consisting of the cells 10 of each grid 6 is arranged, relative to the fuel elements of the assembly, in such a way that each of the cells 12 inside which support tubes are not arranged is in line with a fuel element 1. The network of the grid 6 is thus arranged in substantially the same manner as the cross-piece shown in FIG. 2.

Furthermore, the size of the cells 10 of each of the grids 6 is such that the fuel elements 1 can be extracted by displacing them longitudinally and passing them through the cells of the grid.

When one of the end plates 3 is dismantled, it is therefore possible to extract the fuel elements from the assembly, even though the grids 6 remain permanently fixed to the support tubes 5.

Reference will now be made to FIGS. 4, 5, 6 and 7 in order to describe the method of fixing the grids 6 to the end plates 3. The method is described in respect of the upper grid and end plate. The fixing of the lower grid to the lower end plate is effected in a corresponding way.

This fixing is achieved by means of sockets 7, of cylindrical shape, each of which possesses, at its upper end, an enlarged part 14 of which the lower face constitutes a shoulder 15 which can come into contact with the bottom of a cavity 16 of circular section which is provided in the outer upper face of the end plate 3.

When the upper end plate 3 is positioned on the assembly, its lower face comes into contact with the upper face of the grid 6, and passages 17 of square section, which are provided in the end plate 3 at the centers of the recesses 16 and pass right through this plate 3, coincide with the square cells 10 of the grid. The dimensions of the transverse sections of the recesses 17 are approximately the same as the dimensions of the cells 10.

When the socket 7 is in position it extends through a passage 17 and a cell 10 of the grid, as shown in FIG. 5 and its shoulder 15 comes to rest on the bottom of the recess 16 provided on the upper face of the end plate. The diameter of the cylindrical central part of circular section of the socket 7 is slightly smaller than the side of the cell of the grid.

The socket 7 is also provided, at its lower part, with an enlarged part 18 of square transverse section, the dimensions of which are slightly smaller than the dimensions of a cell 10 and of a passage 17, so that the part 18 can, when appropriately orientated, pass through a passage 17 and a cell 10.

The enlarged upper part 14 of the socket 7 is provided with a slot 20 for engagement by the blade of a screwdriver in order to orientate the socket by rotating the screwdriver. It is thus possible to arrange the socket 7 in such a way that the enlarged lower part 18 is in the position shown in FIG. 7, in which the corners of the part 18 come to bear on the lower surface of the grid.

Once the socket 7 has been introduced into the end plate 3 and the grid 6, as shown in FIGS. 5 and 7, the socket is fixed, with pressure, against the end plate and the inner surface of the grid by expanding the cylindrical part of the socket 7, at the level of the square section passage 17 in the end plate, into the corners of the passage 17, as shown by 19 in FIG. 6.

The deformation 19 can be obtained inside the socket 7 by expansion, that is to say by means of an elongate tool comprising, at its end, rollers which deform the metal of the socket. During this deformation, the metal which is pushed out penetrates into the four corners of the square passage 17 and thus prevents the rotation of the socket relative to the end plate and to the grid. The deformation also causes a slight shortening of the socket, and this causes the end plate 3 to be tightened against the grid 6 via the parts 15 and 18 of the socket, which are in contact with the upper part of the end plate and the lower part of the grid respectively.

It will be understood that the unit consisting of the support tubes 5, the cross-pieces 2 and the grids 6 which are fixed to the ends of the support tubes retains a certain rigidity when one or both of the two end plates 3 are removed, and that it is then possible to extract fuel elements from this structure, or introduce them into this structure, in order to replace the elements or to remove them for the purpose of checking or testing operations.

When it is desired to fit the assembly together again, the fixing of the or each end plate to the corresponding grid is extremely easy because it suffices to place the end plate on the grid so that the passages 17 are in alignment with the cells of the grid, and then to introduce the fixing sockets 7 into some of the passages and cells and to orientate the sockets by means of a screwdriver engaging the slots 20, and finally to produce the deformations 19 inside the sockets 7.

Conversely, when it is desired to dismantle the assembly in order to remove a defective element or an element which is intended for checking or testing operations, the assembly then being located in the swimming pool of the reactor, the operations are even simpler and can easily be carried out by remote control with the assembly immersed.

In order to dismantle the assembly, it suffices, in fact, to introduce the blade of a screwdriver successively into the slots 20 of the various sockets 7 arranged in the end plate which it is desired to dismantle, and to rotate each socket using the screwdriver. The protuberances 19, made in the socket when it was mounted, are then deformed by contact with the inner surface of the passage 17, and this then permits the rotation of the socket and the release of the tightening force between the end plate and the grid. The sockets can then easily be extracted from the cavities, and the end plate can be removed.

The fuel elements are then accessible again.

It is seen that the main advantage of the above described assembly is that it has a connection between the end plates and the rest of the assembly, the making and breaking of which is extremely simple, and, in particular, which avoids machining operations, such as grinding or cutting, when the assembly is dismantled, which operations are likely to contaminate parts of the fuel assembly, likewise, any welding operation which presents the same contamination risks.

Furthermore, even when the end plates have been dismantled, the assembly retains a certain rigidity and a certain stability.

The invention is not intended to be restricted to the embodiment which has been described but, on the contrary, includes all variants thereof, and points of detail can be modified without thereby going outside the scope of the invention. For example, the upper part of the socket 7 may be provided with a hexagonal or square recess into which it is possible to insert a key, of corresponding shape, in place of a slot for a screwdriver blade.

The socket may be tubular, as shown in FIGS. 5 and 6, or it may have solid parts obstructing the flow through the end plate.

The deformable part of the socket may be located at any point on the socket or it may consist of a part added to the socket.

The lower part of the socket may have one of a number of very diverse shapes, provided that the lower part can penetrate through the passage in the end plate and the cell of the grid, and can then, after rotation, present bearing surfaces to the inner surface of the grid.

It is also possible to join one or both of the grids to the upper cross-piece or to the lower cross-piece respectively, that is to say to the cross-piece located closest to the upper end or to the lower end of the assembly, depending on whether the upper grid or the lower grid is concerned. The grid can even form part of the upper cross-piece or the lower cross-piece if the height of the cross-piece is increased and if openings are provided therein for the passage of the locking ends of the sockets.

The grid may be joined to the cross-piece by a number of strips and small plates of which it is made, and particularly by the small plates arranged at the exterior of the grid.

The sockets 7 and the grids 6 are generally made of stainless steel of the same type as the other parts of the assembly, but the use of other materials, chosen, for example, for their useful mechanical properties, is not excluded. However, the grids are preferably made of a material which is identical to the material constituting the end plates, so as to avoid problems due to the thermal expansion of these pieces.

Finally, the connection, by means of a grid and sockets, between the assembly and the end plates can be used for the upper end plate or for the lower end plate of the assembly, or for both these end plates.

I claim:

1. An easily dismountable nuclear reactor fuel assembly comprising:
   a bundle of parallel fuels rods;
   cross-pieces extending transversely relative to said fuel rods and holding said rods apart;
   support tubes which are substituted for some of said fuel rods for supporting said assembly, said support tubes being longer than said fuel rods;
   transverse end plates for longitudinally supporting said fuel rods and for ensuring, in cooperation with said support tubes the rigid assembly of said assembly;
   at least one end of said assembly, a grid which does not contact the fuel rods extending transversely relative to said support tubes in their end parts and inwardly of the corresponding one of said end plates, said grid forming a network of cells which approximately correspond in size and position to said fuel rods so that a said fuel rod can pass by longitudinal displacement through a said cell of said grid;
   means fixing the corresponding ends of said support tubes to said grid; and
   means for detachably fixing said corresponding end plate to said grid, said means comprising cylindrical sockets which extend through passages provided in said corresponding end plate and through some of said cells of said grid, each said socket comprising:
   bearing surfaces at the level of the outer face of said end plate and the inner face of said grid,
   means at the outer end of said socket for cooperation with a tool rotating said socket between a first position in which said socket can be freely inserted into said cell of said grid, and a second position in which said bearing surface at the level of said inner face of said grid comes into contact with said inner face of said grid to lock said grid to said end plate, and
   a deformable part which is expandable into one or more housings provided at the level of said passage in said end plate or of said cell of said grid to prevent rotation of said socket relative to said grid.

2. The fuel assembly according to claim 1, wherein said passages in said end plate and said cells of said grid have a square section and approximately identical dimensions, the central part of each said socket has a circular section the diameter of which is slightly smaller than the dimensions of the square section of said passages in said end plate and of said cells of said grid, and the part of each said socket provided with said bearing surface at the level of said inner face of said grid has a square transverse section the dimensions of which are slightly smaller than the dimensions of the section of said passages in said end plate and said cell of said grid.

3. The fuel assembly according to either claim 1 or claim 2, wherein said grid is fixed to the said crosspiece adjacent thereto.

4. The fuel assembly according to either claim 1 or claim 2, wherein said grid consists of a part of the said cross-piece which is located closest to the ends of said support tubes to which said grid is fixed.

5. The fuel assembly according to claim 1, wherein said deformable part of each said socket is on an additional part made integral with said socket.

* * * * *